United States Patent [19]

Gonthier et al.

[11] Patent Number: 4,946,250

[45] Date of Patent: Aug. 7, 1990

[54] COMPACT WAVELENGTH FILTER INTEGRATED TO A SINGLE-MODE OPTICAL FIBER

[75] Inventors: François Gonthier, Outremont; Xavier Daxhelet, Montreal; Suzanne LaCroix, Verdun; Richard J. Black, Montreal; Jacques Bures, Outremont, all of Canada

[73] Assignee: Ecole Polytechnique, Montreal, Canada

[21] Appl. No.: 404,471

[22] Filed: Sep. 7, 1989

[51] Int. Cl.[5] ............................................. G02B 6/02
[52] U.S. Cl. ............................. 350/96.29; 350/96.15
[58] Field of Search ............... 350/96.15, 96.29, 96.20, 350/96.21, 96.30, 31 E

[56] References Cited

U.S. PATENT DOCUMENTS

| | | | |
|---|---|---|---|
| 3,891,302 | 6/1975 | Dabby et al. | 350/96 |
| 4,606,605 | 8/1986 | Ashkin et al. | 350/96.31 |
| 4,720,160 | 1/1988 | Hicks, Jr. | 350/96.15 |
| 4,743,086 | 5/1988 | Hicks, Jr. | 350/96.15 |
| 4,753,497 | 6/1988 | Fujii et al. | 350/96.15 |
| 4,755,037 | 7/1988 | Bjornlie et al. | 350/96.15 |
| 4,772,085 | 9/1988 | Moore et al. | 350/96.15 |
| 4,779,945 | 10/1988 | Hill et al. | 350/96.15 |
| 4,815,805 | 3/1989 | Levinson et al. | 350/96.16 |
| 4,869,570 | 9/1989 | Yokohama et al. | 350/96.15 |

FOREIGN PATENT DOCUMENTS 0028908 2/1986 Japan .

OTHER PUBLICATIONS

Gonthier et al.: "Compact All-Fiber Wavelength Filter Synthesis for 1300/1500 nm Demultiplexing Isolation", Components for Fiber Optic Applications and Coherent Lightwave Communications, SPIE, vol. 988, pp. 22-26, Sep. 7-9, 1988.
LaCroix et al.: "Interferometric Properties of Tapered Monomode Fibers", ECOC '87 (Helsinki), Tech. Digest I, pp. 219-222, Sep. 1987.
Gonthier et al.: "Broadband All-Fiber Filters for Wavelength Division Multiple-xing Application", Appl. Phys. Lett. 54 (14), pp. 1290-1292, Apr. 3, 1989.
LaCroix et al.: "All-Fiber Wavelength Filter from Successive Biconical Tapers", Optical Society of America, pp. 671-673, 1986.
LaCrois et al.: "Tapered Monomode Optical Fibers: Understanding Large Power Transfer", Applied Optics, vol. 25, No. 23, pp. 4421-4425, Dec. 1st, 1986.
V. J. Tekippe: "Insertion Loss and Isolation of Fused Wavelength Division Multiplexers/Demultiplexers", SPIE, vol. 839, pp. 20-24, Components for Fiber Optic Applications II, (1987).

Primary Examiner—William L. Sikes
Assistant Examiner—Akm E. Ullah
Attorney, Agent, or Firm—James R. Longacre; Michael L. Keller

[57] ABSTRACT

A wavelength filter is integrated to a single-mode optical fiber capable of propagating a light signal and comprising a longitudinal and opaque outer jacket enveloping the fiber. This fiber is stripped of its jacket on a given length thereof to obtain a non-jacketed length of optical fiber. The so produced non-jacketed fiber length is formed with first and second concatenated biconical tapers separated from each other by a given distance and each having a given profile. By appropriately selecting the distance separating the two tapers and the given profile thereof, the filter will enable transmission of a first, predetermined wavelength of the propagated light signal while it will stop a second, predetermined wavelength of the signal. A method of integrating such a filter to a single-mode optical fiber is also proposed.

20 Claims, 5 Drawing Sheets

COMPACT WAVELENGTH FILTER INTEGRATED TO A SINGLE-MODE OPTICAL FIBER

BACKGROUND OF THE INVENTION

1. Field of the Invention

The present invention relates to a compact wavelength filter integrated to a single-mode optical fiber, as well as to a method of manufacturing the wavelength filter.

2. Brief Description of the Prior Art

Optical fibers are well-known in the art and are extensively used in telecommunication and control systems, and in sensing and medical apparatuses. The advantages of the optical fibers over the conventional copper conductors and coaxial cables, when used in telecommunication systems, are so significant that eventually the optical fibers will replace the conventional conductors and cables in many applications for the transmission of information signals.

Optical fibers are waveguides capable of propagating visible and/or infrared light. In order to reduce dispersion of the light signals, single-mode fibers are widely used and constitute the most promising type of optical fibers for telecommunication purposes. An advantage of the single-mode optical fibers is their capacity to carry light signals containing several wavelengths simultaneously. However, many applications require that only certain specific wavelengths be transmitted by the fiber; an optical filter is then necessary to eliminate the undesired wavelengths. Applications such as demultiplexing of wavelengths division multiplexed (WDM) light signals, that is the separation of light signals of different wavelengths transmitted by the same fiber, may require a wavelength filter to isolate correctly the different signals to be separated.

In standard WDM telecommunication systems, two wavelengths are used instead of one to double the data transmission capacity. However, special components such as WDM fused couplers are required to launch signals of different wavelengths, usually 1300 and 1550 nm, in a single fiber and to separate them at the receiving end. Ideal WDM couplers would have a coupling ratio of 100% at 1300 nm and of 0% at 1550 nm, or vice-versa. However, such ideal coupling cannot be obtained in practice and the typical isolation achieved is of approximately 17 dB, which does not satisfy the telecommunication requirements (isolation of the order of 35 dB is required). Additional filtering devices are thus necessary to better separate the demultiplexed signals. These devices usually consist of bulky optics components.

Optical filters exist but they suffer from many disadvantages such as poor performance, high complexity, high manufacturing cost, bulkiness, high loss, etc, and in most of the cases they are not an integrated part of the optical transmission media (fiber).

As an example, Canadian patent application number 517,920 filed on Sept. 10, 1986, in the name of Suzanne Lacroix and Frangois Gonthier, proposes a wavelength filter integrated to a single-mode optical fiber. Such a filter comprises several tapers formed onto the fiber which comprises conventionally an opaque outer jacket. To form each taper, a given length of the outer jacket is removed from the fiber, the latter fiber is then heated locally to the point at which it becomes viscous, and the so heated fiber is stretched along its axis. To heat locally the fiber, a very small heat source such as a small flame is used.

Each taper modifies the light signal transmitted through the single-mode fiber, and the plurality of tapers formed in series onto the optical fiber will perform the function of a wavelength filter. By changing the profile of the tapers, as well as the number of such tapers on the fiber, control of the characteristics of the wavelength filter is enabled.

The integrated wavelength filter of Canadian patent application number 517,920 presents the drawback of not being compact. Also, in the infrared region of the light spectrum, the technique involved cannot be applied as its efficiency reduces.

Compact wavelength filters capable of being integrated to an optical fiber and eventually in WDM couplers packages are therefore sought to solve this problem.

In the present disclosure and in the appended claims, the term "light" is intended to encompass both visible and invisible light including of course infrared light, and which may propagate in the wavelength filter in accordance with the present invention integrated to an optical fiber.

OBJECTS OF THE INVENTION

An object of the present invention is therefore to eliminate the above discussed drawbacks of the prior art wavelength filters.

Another object of the invention is to provide a compact wavelength filter integrated to a single-mode optical fiber and which can be realized with fibers of different index profiles (matched-cladding or depressed-cladding).

A further object of the invention is a compact wavelength filter which is almost temperature independent and which is also independent of the polarization of the light.

A still further object of the invention is a compact wavelength filter offering good isolation and low loss over a wide wavelength bandwidth.

SUMMARY OF THE INVENTION

The present invention is more specifically concerned with a wavelength filter integrated to a single-mode optical fiber capable of propagating a light signal and comprising a longitudinal outer jacket enveloping the optical fiber. The fiber is stripped of its jacket on a given length thereof to form a non-jacketed length of optical fiber, which non-jacketed fiber length being formed with at least two concatenated biconical tapers separated from each other by a given distance and each having a given profile. The distance separating the two tapers and the profile of each of these tapers can be chosen to enable transmission through the filter of a first, predetermined wavelength of the propagated light signal while stopping a second, predetermined wavelength of the latter signal.

The invention is further concerned with a method of integrating a wavelength filter to a single-mode optical fiber capable of propagating a light signal and comprising a longitudinal outer jacket enveloping the optical fiber. This method comprises the steps of:

(a) stripping the optical fiber of its jacket on a given length thereof to form a non-jacketed length of optical fiber;

(b) heating the non-jacketed fiber length at a first location thereof up to a point at which the optical fiber becomes viscous;

(c) producing a longitudinal tension in the fiber to stretch the heated first location and thereby form a first biconical taper having a given profile;

(d) heating the non-jacketed fiber length at a second location thereof spaced apart from the first location up to a point at which the optical fiber becomes viscous; and (e) producing a longitudinal tension in the fiber to stretch the heated second location and thereby form a second biconical taper also having a given profile and separated from the first taper by a given distance;

Again, during the integrating process, the distance separating the two tapers and the profile of these tapers can be adjusted to enable transmission through the resulting filter of a first, predetermined wavelength of the propagated light signal while stopping a second, predetermined wavelength of the latter signal.

The method in accordance with the invention enables low cost production of high performance wavelength filters from optical fibers having different index profiles (matched-cladding or depressed-cladding). Such filters have a very simple structure and offer good isolation (about 15 dB) and low loss (less than 1 dB) over a wide wavelength bandwidth (typically 40 nm). They are compact their length is shorter than 1 cm. They are almost temperature independent and are also independent of the polarization of the light.

The objects, advantages and other features of the present invention will become more apparent upon reading at the following non restrictive description of a preferred embodiment thereof, given by way of example only with reference to the accompanying drawings.

DETAILED DESCRIPTION OF THE PREFERRED EMBODIMENT

Figure 1:
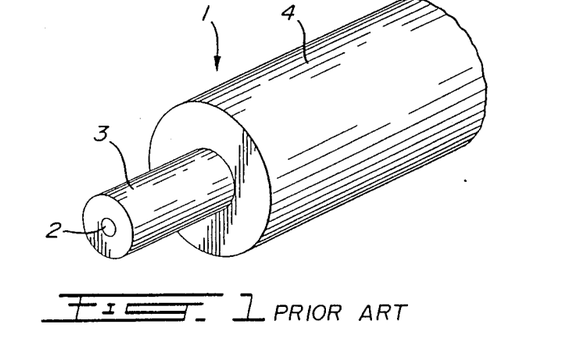
FIG. 1, which is labelled as prior art, provides a schematic illustration of the structure of a conventional, single-mode optical fiber.

A conventional single-mode optical fiber 1 is illustrated in FIG. 1 and comprises a longitudinal core 2 made of transparent material such as germanium doped silica, a longitudinal cladding 3 surrounding the core 2 and made of transparent material such as pure silica, and a longitudinal jacket 4 made of opaque plastic material surrounding the cladding 3 and acting as a cladding-mode stripper.

Optical fiber 1 is well known in the art and is commonly used in telecommunications and control systems. There exists essentially two types of single-mode fibers commonly used in the infrared: the matched-cladding one and the depressed-cladding one. These two types of optical fiber are well known to those skilled in the art.

The wavelength filter in accordance with the present invention comprises two concatenated biconical tapers 8 and 9 (FIG. 3) along the path of light defined by the single-mode fiber 1. As illustrated in detail in FIG. 2, each taper 8, 9 is composed of two conical regions 11 and 12 separated by a central region 13. It can be seen from FIG. 3 that the tapers 8 and 9 are formed at spaced apart locations on the fiber 1. More specifically, they are separated by a length "L". A non-altered section of fiber 10 is therefore present between the two tapers 8 and 9. The fiber is stripped of its jacket 4 in the region of the tapers 8 and 9 and section 10 of fiber.

Single-mode fibers such as 1 (FIG. 1) are so designed that only one mode, namely the mode $HE_{11}$, can propagate in the core-cladding guide, i.e. due only to guidance provided by the index of the core being higher than that of the surrounding cladding. This is a core-mode. However, if the jacket 4 is removed and the fiber surrounded by air, modes of higher order such as $HE_{12}$ can propagate due to additional guidance provided by the cladding-air interface. The latter modes are referred to as cladding-modes which obviously can propagate in the cylindrical section 10.

Figure 3:
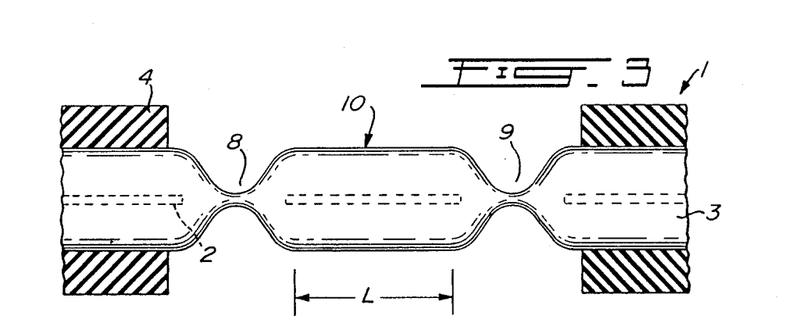
FIG. 3 illustrates the structure of a wavelength filter in accordance with the present invention integrated to a single-mode optical fiber such as that shown in FIG. 1.

Considering the light signal propagating from the left to the right, the conical regions 11 and 12 of the taper 8 constitute coupling regions where the power of the core-mode $HE_{11}$ is transferred to the cladding-modes $HE_{1m}$, but mainly $HE_{12}$, having the same circular symmetry as the core-mode and vice-versa for the conical regions 11 and 12 of the taper 9. In the central region 13 of each taper 8, 9 the light signal is essentially guided by the cladding surrounded by the ambient air. The region 13 is highly multimode and cladding-modes excited in the first conical region 11 propagate therein without coupling, thereby accumulating phase differences between them. The coupling in the second conical region 12 depends on these accumulated phase differences. Thus, core transmission of light power through a taper such as 8 or 9 depends on the length and shape of their central region 13. The light power that is not recovered in the core-mode after passage of the light signal through to the filter is lost in the cladding-modes which are excited in the filter (tapers 8 and 9 and central section 10) and which cannot be re-excited in the fiber 1, the latter being capable of supporting only one core-mode, namely the mode $HE_{11}$.

Each taper 8, 9 is a constriction or narrowing of the single-mode optical fiber 1. As will be described in more detail in the following description, each taper may be formed on the fiber 1 by heating locally the fiber, using for example a flame, up to a point at which the optical fiber becomes viscous. The fiber is then stretched by applying a small tension along the longitudinal axis thereof. The heat is then removed allowing the fiber to cool.

Assuming that only two modes ($HE_{11}$, $HE_{12}$) are involved in the tapered region, the following relation can be used to approximate core transmission of light power through a taper formed on a single-mode fiber:

$$T(\lambda) = 1 - R_0 \sin^2\left[\frac{\pi}{\Lambda}(\lambda - \lambda_p)\right] \quad (1)$$

where:

$T(\lambda)$ is the normalized transmitted light power at the wavelength $\lambda$;

$\lambda$ is the wavelength of the light signal;

$R_0$ is the amplitude of the spectral response of the taper;

$\Lambda$ is the period of the spectral response; and $\lambda_p$ is a reference wavelength at which the power transmission of the taper is maximum.

If it is considered that there is no loss, the complementary power transmission, that is light power transmission by the cladding-modes, mainly $HE_{12}$, can be approximated by the following relation:

$$R(\lambda) = 1 - T(\lambda) = R_0 \sin^2\left[\frac{\pi}{\Lambda}(\lambda - \lambda_p)\right] \quad (2)$$

Knowing the relation approximating the core and complementary power transmissions through each taper 8 and 9, one can approximate the global transmission of light power through the two concatenated tapers 8 and 9 and the intermediate, stripped cylindrical section 10 illustrated in FIG. 3. More specifically, this global transmission can be approximated by the following relation:

$$\tau = TT' + RR' + 2\sqrt{TT'RR'}\cos(\delta\beta L) \quad (3)$$

where:

T is the core transmission of the first taper 8;

T' is the core transmission of the second taper 9;

R is the complementary transmission of the first taper 8, i.e. transmission in the cladding-mode $HE_{12}$;

R' is the complementary transmission of the second taper 9;

$\delta\beta$ is the difference between the propagation constants of the two modes $HE_{11}$ and $HE_{12}$ beating in the intermediate stripped cylindrical section 10 of length L. The dependence of the term $\delta\beta$ on the wavelength $\lambda$ is determined by the index profile of the fiber in the section 10. The product $\delta\beta L$ is therefore representative of the accumulated phase differences in the stripped fiber section 10, that is the product of the difference between the propagation constants of the two modes $HE_{11}$ and $HE_{12}$ propagating in the section 10 by the length L of the latter section.

Of course, the terms $\tau$, T, T', R and R' are function of the wavelength $\lambda$.

Assuming there is no loss, one can further determine the two following relations from the above relation (2):

$$R(\lambda) + T(\lambda) = 1 \quad (4)$$

$$R'(\lambda) + T'(\lambda) = 1 \quad (5)$$

Figure 2:
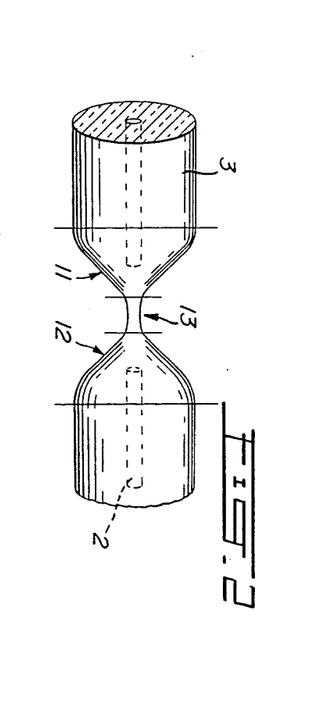
FIG. 2 illustrates the structure of a tapered fiber.

As evidenced hereinabove, the characteristics of the wavelength filter of FIGS. 2 and 3 depends on the following parameters:

(1) the core transmission of light power T and T' of the tapers 8 and 9 determined by the index profile of the optical fiber and the geometric profile of these tapers; and (2) the length L of the intermediate section 10 and also the difference $\delta\beta$ between the propagation constants of the modes $HE_{11}$ and $HE_{12}$, which difference depends on the index profile of the fiber in the section 10.

The global power transmission $\tau(\lambda)$, given by the relation 3, can be regarded as an interferometric pattern having a fringe contrast given by the following relation:

$$C(\lambda) = \frac{2\sqrt{RR'TT'}}{RR' + TT'} \quad (6)$$

The fringe contrast $C(\lambda)$ is determined only by the two tapers 8 and 9, whereas the phase thereof depends on the length L of the intermediate cylindrical section 10.

Thanks to the parameters involved, it is possible to synthesize a large number of possible wavelength responses for the filter of FIG. 3. As an example, one can realize a filter with $\lambda_1$-pass/$\lambda_2$-stop or $\lambda_2$-pass/$\lambda_1$-stop responses in which $\lambda_1$ and $\lambda_2$ are two predetermined wavelengths; for example the wavelength $\lambda_1$ is 1300 nm and $\lambda_2$ 1550 nm in conventional WDM systems.

In order to realize a passband filter at the wavelength $\lambda_p$ (e.g. $\lambda_p = 1300$ nm) one has to choose $R(\lambda_p) = R'(\lambda_p) = 0$. This condition ensures a maximum transmission of light power through the filter at the wavelength $\lambda_p$. To stop the wavelength $\lambda_s$, one must realize simultaneously the maximum contrast condition $C(\lambda_s) = 1$, and the destructive interference condition. The maximum contrast condition is obtained when the tapers have complementary power transmissions:

$$T(\lambda_s) = 1 - T'(\lambda_s) = R'(\lambda_s) \quad (7)$$

If the tapers 8 and 9 are identical, all the transmission and reflection coefficients are equal: $T(\lambda_s) = T'(\lambda_s) = R(\lambda_s) = R'(\lambda_s) = \frac{1}{2}$.

If experimentally the transmissions are not perfectly complementary, the maximum contrast may also be obtained by inducing some loss in the cladding-modes of the fiber section 10 until minimum transmission is obtained.

The destructive interference condition is given by the relation:

$$\delta\beta L = (2n+1)\pi \quad (8)$$

in which n is an integer.

It should be noted that the condition of maximum power transmission at the wavelength $\lambda_p$ also makes the fringe contrast $C(\lambda_p) = 0$ allowing a large passband width. To realize a large stopband width, one must choose the shortest length L possible fulfilling the destructive interference condition (relation (8)), i.e. one must set the integer n=0. With this additional condition, one can enlarge the undesired fringe period (period of the oscillations in the light power transmitted through the filter between the wavelength $\lambda_p$ and $\lambda_s$) and thus broaden the stop-band width. The condition n=0 determines the length L, taking of course into consideration the characteristics of the optical fiber.

Figure 4:
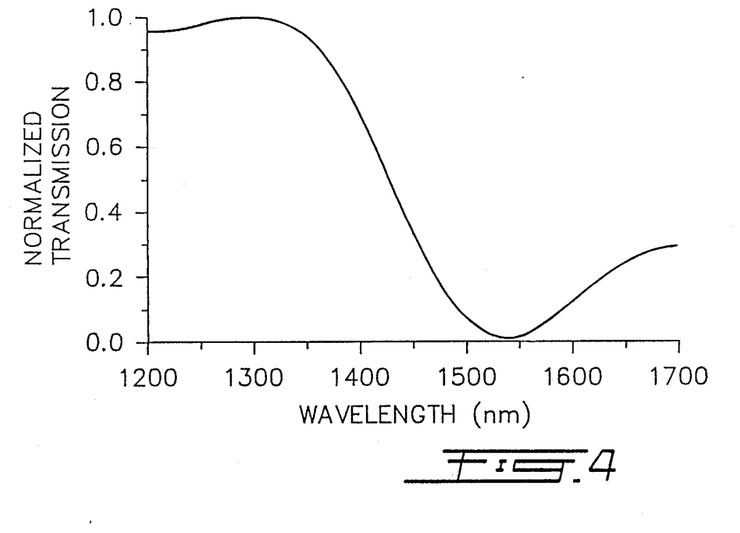
FIGS. 4 and 5, are graphs representing theoretical wavelength responses of example filters in accordance with the present invention.
Figure 5:
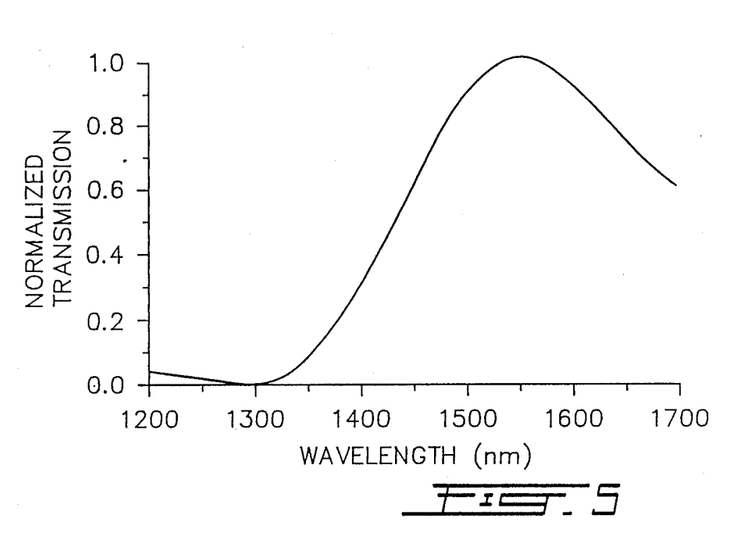

Knowing the fiber index profile, one can calculate $\delta\beta$ and derive theoretical power transmissions $\tau(\lambda)$ through the filter. Examples of wavelength responses of such theoretical filters are given in FIGS. 4 and 5. More specifically, FIG. 4 represents the theoretical wavelength response of a 1300 nm-pass/1550 nm-stop filter according to the invention, while FIG. 5 shows the theoretical wavelength response of a 1300 nm-stop/1550 nm-pass filter.

Figure 6:
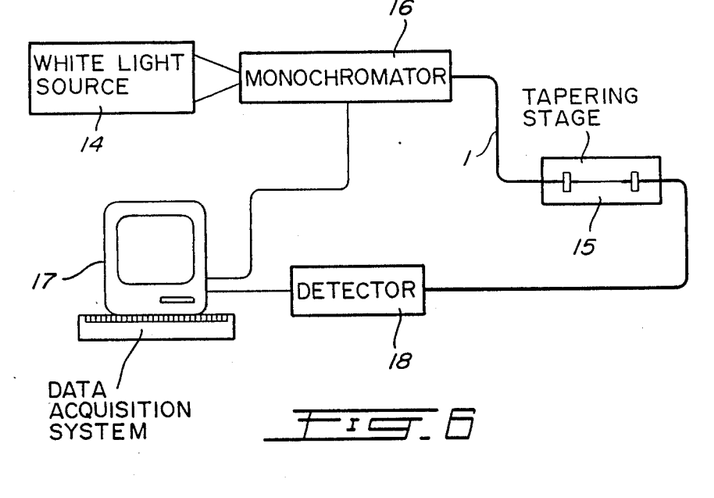
FIG. 6 shows a possible setup which can be used in the manufacture of the wavelength filter according to the present invention.
Figure 7:
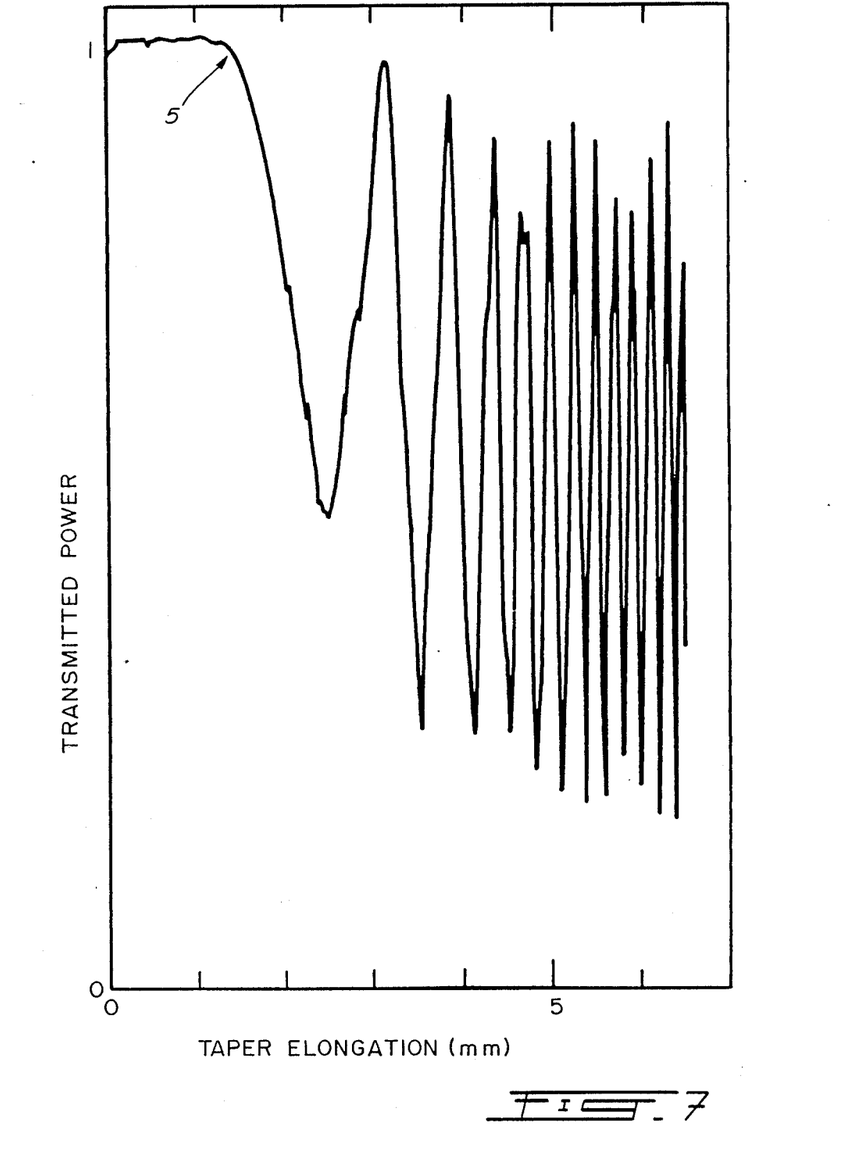
FIG. 7 is a graph showing an example of oscillations in the amplitude of a monochromatic light signal propagated in a single-mode fiber as a taper of the wavelength filter is produced.

A possible setup used for manufacturing and testing the integrated wavelength filter is shown in FIG. 6. More specifically, the manufacturing procedure comprises the following steps:

(a) first of all, the optical fiber 1 is stripped of its jacket 4 a few centimeters long to form a non-jacketed length of optical fiber;

(b) the optical fiber 1 is connected between a monochromator 16 and a light detector 18. A source 14 emitting white light is connected to the monochromator 16 and a computerized data acquisition system 17 is connected to both the monochromator 16 and detector 18 to receive information therefrom;

(c) sweeping a wavelength bandwidth with the monochromator 16 and recording in the system 17 the wavelength response of the non altered fiber 1 whereby the data acquisition system 17 can establish a normalization curve used as reference;

(d) preparing, if necessary, the fiber 1 by etching the same with hydrofluoric acid and/or pre-tapering it using a large flame, with a typical width of 5 mm. Indeed, one can manipulate the fiber index profile by etching or pre-tapering the fiber 1 before forming thereon the two tapers of the filter. Such preparation of the fiber can facilitate simultaneous fulfillment of all the optimum conditions and accordingly can facilitate the fabrication of the integrated filter;

(e) selecting with the monochromator 16 the passband center wavelength $\lambda_p$; one can alternatively use a monochromatic source emitting a light beam at the wavelength $\lambda_p$;

(f) making the first taper 8 by locally heating the non-jacketed length of fiber 1 (e.g. with a microtorch flame of width typically 0.5 mm which must be set according to the fiber used for experimentation and to the desired taper transmission) until the fiber becomes viscous, and by stretching it longitudinally by means of a longitudinal tension as shown at 15 in FIG. 6. The fiber is tapered until oscillations appear in the transmission vs elongation curve of FIG. 7, which curve can be displayed by the system 17. The elongation is stopped at a maximum, that is for a number N of oscillations observed in the curve of FIG. 7 at the wavelength $\lambda_p$. Typically N is an integer and is equal to 0, 1 or 2. N=0 corresponds to the region 5 of the curve of FIG. 7, where the transmitted power reduces for the first time. Indeed, as illustrated in FIG. 7, the optical power transmitted from the source 14 to the detector 18 through the monochromator 16 varies as the fiber 1 is tapered, and oscillations such as those shown in the latter Figure are produced. N represents the number of these oscillations observed during the tapering operation;

(g) recording the wavelength response of the first taper 8 in the system 17 and normalizing it to determine whether the passband of the latter taper is centered on the wavelength $\lambda_p$;

(h) moving the heat source (e.g. flame) away from the fiber and then along the fiber to place it at the appropriate distance from the first taper 8, this distance being typically ≦3 mm;

(i) making the second taper 9 with N equal to 0, 1 or 2 by heating locally the non jacketed length of fiber until it becomes viscous and by producing a longitudinal tension in the fiber to stretch the same. The second taper 9 may be identical to or different from the first one (N can be equal or different from that of the taper 8);

(j) recording the wavelength response of the so formed filter and normalizing it;

(k) analysing the wavelength response recorded in step (j) and checking if the zero power transmission, i.e. the destructive interference and the maximum contrast conditions are realized at the wavelength $\lambda_s$. If not, one has to adjust those conditions: the destructive interference is achieved by setting the monochromator at the wavelength $\lambda_s$ and tapering the non jacketed fiber section 10 between the two tapers 8 and 9 until minimum power transmission is obtained.

After the correct manufacturing parameters have been established for a given type of fiber, it will be apparent to those skilled in the art that the manufacturing procedure can be greatly simplified. As an example, laser diodes at the pass and stop wavelengths can be used instead of the white light source 14 and monochromator 16 to determine maximum and minimum power transmissions This enables a more precise monitoring and thus a more precise adjustment for a better performance of the filter. Also, for a mass production of the wavelength filter according to the present invention, it may be envisaged to produce each taper by stretching the optical fiber a predetermined length, instead of counting for each taper the number of oscillations of the amplitude of a light signal propagated in the fiber. This method, well suited for a highly automated production would require a device that can elongate the optical fiber with precision, and has an important advantage in that it obviates the use of an equipment to monitor the propagated light signal However, it should be noted that the heat source, used to soften the fiber prior the stretching, must have highly reproducible characteristics, such as the flame size, temperature etc., in order to produce tapers having identical responses from one production run to another Generally speaking, if the manufacturing setup has non reproducible characteristics, tapers having the same length, may not have the same wavelength response.

Figure 8:
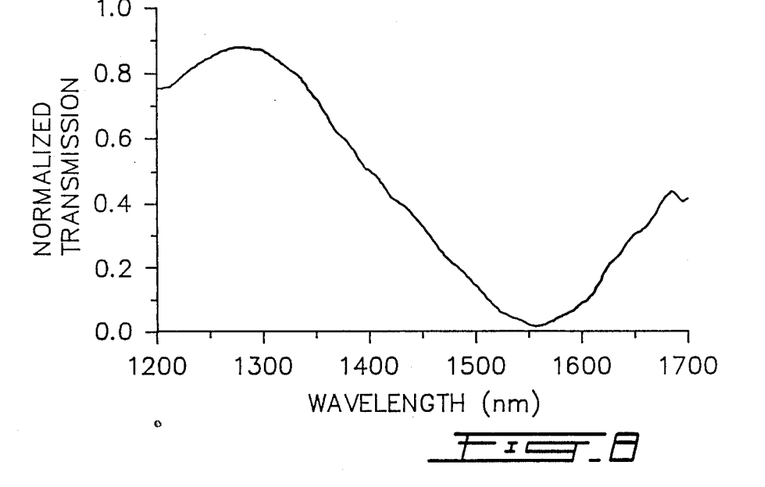
FIGS. 8 and 9 are graphs representing experimental wavelength responses of integrated filters according to the invention.
Figure 9:
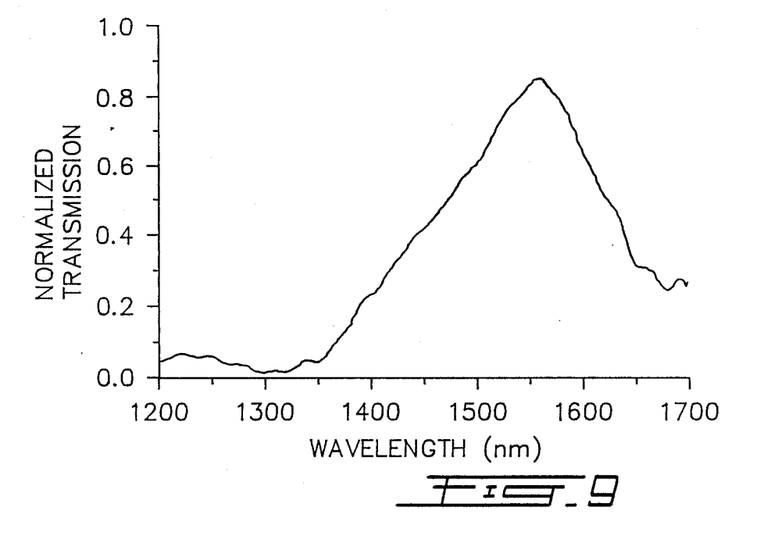

Typical experimental results obtained are shown in FIGS. 8 and 9, for a matched-cladding fiber using the pre-tapering technique. A symmetric configuration has been chosen to realize the 1300 nm-pass/1550 nm-stop filter of FIG. 8, i.e the two tapers 8 and 9 are identical with N=1 at the wavelength $\lambda_p=1300$ nm. Concerning the 1550 nm-pass/1300 nm-stop filter of FIG. 9, it has been formed with two different tapers 8 and 9 with N=1 and N=2, respectively, at the wavelength $\lambda_p=1550$ nm. The total length of these two filters is shorter than 1 centimeter, whereby very compact filters can be integrated to a single-mode optical fiber in accordance with the present invention. Such filters offer good isolation (about 15 dB) and low loss (less than 1 dB) over a wide wavelength bandwidth (typically 40 nm).

Although the present invention has been described hereinabove by way of a preferred embodiment thereof, such an embodiment can be modified at will, within the scope of the appended claims, without departing from the spirit and nature of the present invention.

What is claimed is:

1. A wavelength filter integrated to a single-mode optical fiber capable of propagating a light signal and comprising a longitudinal outer jacket enveloping the optical fiber, the said fiber being stripped of its jacket on a given length thereof to form a non-jacketed length of optical fiber, said non-jacketed fiber length being formed with first and second concatenated biconical tapers separated from each other by a given distance and each having a given profile, wherein the said given distance and the given profile of each biconical taper can be chosen to enable transmission through the filter of a first, predetermined wavelength of the propagated light signal while stopping a second, predetermined wavelength of said signal.

2. The wavelength filter of claim 1, wherein said first and second biconical tapers have identical profiles.

3. The wavelength filter of claim 1, in which the said first and second biconical tapers have different profiles.

4. The wavelength filter of claim 1, wherein a non-jacketed section of said optical fiber is interposed between the first and second biconical tapers.

5. The wavelength filter of claim 4, in which said given distance separating the first and second tapers is given by the following relation:

$$\delta\beta L = (2n+1)\pi$$

where:

L is said given distance separating the first and second tapers;

$\delta\beta$ is a difference between propagation constants of two light propagation modes beating in said non-jacketed section of optical fiber interposed between the first and second biconical tapers; and n is an integer.

6. The wavelength filter of claim 4, in which normalized light power $\tau(\lambda)$ transmitted through the said filter at a given wavelength $\lambda$ is approximated by the following relation:

$$\tau(\lambda) = T(\lambda)T'(\lambda) + R(\lambda)R'(\lambda) + 2\sqrt{T(\lambda)T'(\lambda)R(\lambda)R'(\lambda)} \cos(\delta\beta L)$$

where:

$T(\lambda)$ is the normalized light power transmitted through the first taper at the wavelength $\lambda$;

$T'(\lambda)$ is the normalized light power transmitted through the second taper at the wavelength $\lambda$;

$R(\lambda) = 1 - T(\lambda)$ $R'(\lambda) = 1 - T'(\lambda)$ $\delta\beta$ is a difference between propagation constants of two light propagation modes beating in said non-jacketed section of optical fiber interposed between the first and second biconical tapers; and L is said given distance separating said first and second concatenated tapers.

7. The wavelength filter of claim 6, in which the terms $T(\lambda)$ and $T'(\lambda)$ are given by an expression of the form:

$$1 - R_0 \sin^2\left[\frac{\pi}{\Lambda}(\lambda - \lambda_p)\right]$$

where:

$R_0$ is the amplitude of the spectral response of the corresponding taper;

$\Lambda$ is the period of the wavelength response; and $\lambda_p$ is a reference wavelength at which light power transmitted through the first and second tapers, respectively, is maximum.

8. A wavelength filter integrated to a single-mode optical fiber capable of propagating a light signal and comprising a longitudinal outer jacket enveloping the optical fiber, the said fiber being stripped of its jacket on a given length thereof to form a non-jacketed length of optical fiber, said non-jacketed fiber length being formed with at least two concatenated biconical tapers separated from each other by a given distance and each having a given profile, wherein the said given distance and the given profile of each biconic taper can be chosen to enable transmission through the filter of a first, predetermined wavelength of the propagated light signal while stopping a second, predetermined wavelength of said signal.

9. A method of integrating a wavelength filter to a single-mode optical fiber capable of propagating a light signal and comprising a longitudinal outer jacket enveloping the optical fiber, said method comprising the steps of:

(a) stripping said optical fiber of its jacket on a given length thereof to form a non-jacketed length of optical fiber;

(b) heating said non-jacketed fiber length at a first location thereof up to a point at which the optical fiber becomes viscous;

(c) producing a longitudinal tension in said fiber to stretch said heated first location and thereby form a first biconical taper having a given profile;

(d) heating said non-jacketed fiber length at a second location thereof spaced apart from said first location up to a point at which the optical fiber becomes viscous; and (e) producing a longitudinal tension in said fiber to stretch said heated second location and thereby form a second biconical taper also having a given profile and separated from said first taper by a given distance;

wherein the said given distance and the given profile of each of said first and second tapers can be adjusted to enable transmission through the filter of a first, predetermined wavelength of the propagated light signal while stopping a second, predetermined wavelength of said signal.

10. The method of claim 9 further comprising the step of etching the non-jacketed fiber length with an acid before carrying out said steps (b) to (e).

11. The method of claim 9, further comprising the step of pre-tapering non-jacketed fiber length carrying out steps (b) to (e).

12. The method of claim 9, further comprising the steps of:

propagating a monochromatic light signal through the optical fiber; and stopping stretching of said heated first location after occurrence of a number N, N being an integer, of oscillations in the amplitude of said propagated monochromatic signal.

13. The method of claim 12, further comprising the step of stopping stretch of said heated second location after occurrence of a N', N' being an integer, of oscillations in the amplitude of said propagated monochromatic signal.

14. The method of claim 13, wherein at least of the numbers N and N' is equal to 0.

15. The method of claim 13, wherein at least one of the numbers N and N' is equal to 1.

16. The method of claim 13, in which at least one of the numbers N and N' is equal to 2.

17. The method of claim 13, in which said numbers N and N' are different.

18. The method of claim 13, in which said numbers N and N' are equal.

19. The method of claim 9, further comprising the step of tapering a non-jacketed section of said optical fiber separating the first and second biconical tapers.

20. The method of claim 9, further comprising the steps of:
  propagating a white light signal through the optical fiber; and
  analysing wavelength responses of the filter after step (c) and after step (e) to determine whether said filter has desired wavelength filtering characteristics.

* * * * *